United States Patent
Kulbakh et al.

[15] 3,683,071

[45] Aug. 8, 1972

[54] PROCESS FOR PRODUCING SODIUM SALT OF LEVORIN

[72] Inventors: Valter Osvaldovich Kulbakh; Galina Vasilievna Kholodova; Jury Fedorovich Sveshnikov, all of Leningrad, U.S.S.R.

[73] Assignee: Leningradsky nauchno-issledovatelskr Institut Antibiotikov, Leningrad, U.S.S.R.

[22] Filed: Aug. 6, 1969

[21] Appl. No.: 848,094

[52] U.S. Cl. .................................................424/119
[51] Int. Cl. ............................................A61k 21/00
[58] Field of Search..........................424/115–124

[56] References Cited

OTHER PUBLICATIONS

Chemical Abstracts, Vol. 67, 1967, Page 1424, 14831s.

Primary Examiner—Sam Rosen
Attorney—Waters, Roditi, Schwartz & Nissen

[57] ABSTRACT

A process for producing the sodium salt of levorin wherein levorin suspended in a binary mixture acetone-water or a triple mixture acetone-methylene chloride-water is reacted with an aqueous solution of sodium hydroxide, the resulting salt being subsequently precipitated with acetone.

6 Claims, No Drawings

PROCESS FOR PRODUCING SODIUM SALT OF LEVORIN

The present invention relates to a process for producing the sodium salt of levorin a heptaene, macrolide antibiotic. The sodium salt of levorin finds application in medical practice for treatment of candidiasis of the mucosa of the mouth, nasopharynx, upper respiratory passages, lungs, candidiasic vulvovaginitis, urethritis, cystitis as well as pulmonary aspergillosis, for prophylactic treatment of candida carriers and also for preventing yeast and fungal contamination when preparing tissue cultures, and in agriculture for the control of Verticillium wilt in cotton.

Methods are known of preparing the sodium salt of levorin wherein the antibiotic levorin dissolved in anhydrous methanol is reacted with sodium butylate, sodium methylate or sodium hydroxide at room or lower temperature. The insoluble impurities are then removed by filtration and the filtrate is concentrated under reduced pressure in a stream of nitrogen, the inactive impurities being precipitated and filtered off whereupon the desired product is precipitated with an excess of ethyl acetate.

The disadvantage of the known methods lies in their complicacy from the engineering standpoint due to the necessity of using large volumes of toxic anhydrous methanol and inflammable ethyl acetate as well as the necessity of the concentrate evaporation step resulting in partial inactivation of the antibiotic.

It is an object of the present invention to provide a simpler production process for preparing the desired product, said process giving a product of higher quality.

This object has been accomplished by a process for preparing the sodium salt of levorin by reacting levorin with sodium hydroxide with the subsequent isolating and purifying the desired product wherein, according to the invention, the levorin is suspended in an aqueous-organic medium and reacted with an aqueous solution of sodium hydroxide, preferably a 1 N solution of sodium hydroxide at a temperature of 20°–45° C with the subsequent isolation of the desired product by precipitating the product with acetone.

It is expedient to employ 80 percent aqueous acetone or a triple mixture consisting of acetone, methylene chloride and water taken in the ratio of 80:9:20, respectively as the aqueous organic medium.

For acceleration of the heterogeneous process of salt formation it is advantageous to carry out the reaction of levorin suspension with an aqueous solution of sodium hydroxide at a temperature of 40°–42° C in case use is made of an 80 percent aqueous acetone or at a temperature of 30°–32° C in case a triple mixture consisting of acetone, methylene chloride and water is employed.

The sodium salt of levorin is precipitated with 98 percent acetone.

The present process is accomplished in the following manner.

The initial antibiotic levorin is suspended in aqueous acetone or in a triple mixture consisting of acetone, methylene chloride and water and to the suspension thus obtained there is added a 1 N aqueous solution of sodium hydroxide taken in excess of up to 1.2 equivalents required for the completeness of the reaction.

The insoluble impurities are removed from the reaction mixture by filtration and centrifugation. The sodium salt of levorin is precipitated from the transparent filtrate obtained with 7 volumes of 98 percent acetone.

The precipitate thus obtained is separated by centrifugation, washed with 98 percent acetone and dried in a vacuum drier.

The present process makes it possible to simplify the production of the sodium salt of levorin.

The employment of less toxic and less inflammable and explosive solvents makes it possible to decrease the volume of the reaction medium to one-third, thus eliminating the step of evaporating the solution of the sodium salt of levorin, which results in preparing the sodium salt of levorin having a specific activity of more than 25,000 units/mg.

The sodium salt of levorin prepared by the present process has a surface tension of 52 erg/cm$^2$, which is conducive to decreasing the effective dose of said antibiotic when applied in medicine and phytopathology to one-fourth as compared to that of the starting antibiotic thus providing an essential economic effect, while simplifying the application of the drug as well as widening the sphere of its application.

For a better understanding of the present invention by those skilled in the art the following examples of preparing the sodium salt of levorin are given by way of illustration.

Example 1

One g of levorin having an activity of 28,000 units/mg was suspended in 50 ml of a 80 percent aqueous solution of acetone and 1.2 equivalents of 1 N aqueous solution of sodium hydroxide was added thereto with vigorous stirring and heating up to a temperature of 40°–42° C. The insoluble impurities were removed by filtration and centrifugation. Seven volumes of 98 percent acetone were then added to the absolutely transparent filtrate with stirring. The precipitate formed was separated by centrifugation, washed with 98 percent acetone and dried in a vacuum drying oven under a residual pressure of not more than 10 mm Hg and at a temperature of 20° C.

Six hundred and ten mg of the sodium salt of levorin were obtained having an activity of 40,500 units/mg. The yield was 61 percent (weight basis) and 86 percent (activity basis).

Example 2

One g of levorin having an activity of 30,000 units/mg was suspended in 50 ml of a triple mixture consisting of acetone, methylene chloride and water taken in the ratio of 80:9:20 respectively, and 1.2 equivalents of 1 N aqueous solution of sodium hydroxide was added thereto with vigorous stirring and heating up to a temperature of 30°–32° C. The insoluble impurities were removed by filtration and centrifugation. Seven volumes of 98 percent acetone were then added to the absolutely transparent filtrate with stirring. The precipitate formed was separated by centrifugation, washed with 98 percent acetone and dried in a vacuum drying oven under a residual pressure of not more than 10 mm Hg and at a temperature of 20° C.

Eight hundred mg of the sodium salt of levorin were obtained having an activity of 35,000 units/mg. The yield was 80 percent (weight basis) and 93.3 percent (activity basis).

What we claim is:

1. A process for producing the sodium salt of levorin comprising reacting levorin suspended in an aqueous acetone reaction medium with an aqueous solution of sodium hydroxide at a temperature of 20° – 45° C. and subsequently precipitating the sodium salt thus formed with acetone.

2. A process as in claim 1 wherein the aqueous solution of sodium hydroxide is a 1 N solution.

3. A process as in claim 1 wherein the reaction medium is an 80 percent aqueous solution of acetone and the reaction is carried out at a temperature of 40°–42° C.

4. A process as in claim 1 wherein the reaction medium is a mixture of acetone, methylene chloride and water in the ratio of 80:9:20 and the reaction is carried out at a temperature of 30°–32° C.

5. A process as in claim 1 wherein the sodium salt of levorin is precipitated with 98 percent acetone.

6. A process as in claim 1 wherein 1.2 equivalents of sodium hydroxide are used.

* * * * *

UNITED STATES PATENT OFFICE
CERTIFICATE OF CORRECTION

Patent No. 3,683,071　　　　　　　　Dated August 8, 1972

Inventor(s) Valter Osvaldovich Kilbakh et al

It is certified that error appears in the above-identified patent and that said Letters Patent are hereby corrected as shown below:

On the cover sheet [73] the name of the assignee should read -- LENINGRADSKY NAUCHNO-ISSLEDOVATELSKY INSTITUT ANTIBIOTIKOV --.

Signed and sealed this 19th day of December 1972.

(SEAL)
Attest:

EDWARD M. FLETCHER, JR.　　　　　　　ROBERT GOTTSCHALK
Attesting Officer　　　　　　　　　　　Commissioner of Patents